Nov. 10, 1959  E. F. FLINT  2,912,494
TELEVISION GUNSIGHT
Filed Jan. 20, 1956  2 Sheets-Sheet 1

EDWARD F. FLINT
INVENTOR.

BY
ATTORNEYS

Nov. 10, 1959 E. F. FLINT 2,912,494
TELEVISION GUNSIGHT
Filed Jan. 20, 1956 2 Sheets-Sheet 2

EDWARD F. FLINT
INVENTOR.

BY

ATTORNEYS

United States Patent Office 2,912,494
Patented Nov. 10, 1959

2,912,494
TELEVISION GUNSIGHT

Edward F. Flint, Rochester, N.Y., assignor to Eastman Kodak Company, Rochester, N.Y., a corporation of New Jersey Application January 20, 1956, Serial No. 560,922

6 Claims. (Cl. 178—6.8)

This invention relates to scanning sights such as used for gunsights, photoviewers and bombsights on airplanes. A scanning sight is one capable of viewing in any selected direction over a wide range. The non-military applications of the present invention include the remote survey of any preselected area such as a room or of the operation of an automatic machine.

The scanning is conventional. For example, two rotatable reflectors with their axes of rotation at right angles are aligned to direct light from any selected direction into a telescope. However, since the present invention also involves television, care must be exercised not to confuse the slightly different meanings of the term "scan" or "scanning." As used above, it refers to selecting a line of sight (as when one "scans" the horizon). In television, scanning involves a rapidly and continuously moving spot of light or electron beam. Which meaning is intended will be apparent from the context.

The present invention provides television viewing of the image normally seen in the eyepiece of a scanning sight.

The purpose of this overall feature is to permit the viewing to be remote or at a convenient location. More particularly, it is to permit the observer to have greater freedom of movement and greater freedom in selecting which way he wants to face. Viewing an image through an eyepiece is very confining compared to viewing an enlarged image on a television screen.

However, all is not easy or favorable when one tries to provide the above combination. There are practical limitations with respect to each of the optical and electrical units used and the results are far from satisfactory in the absence of the interrelationships which constitute the present invention. Thus the primary object of the present invention is to solve the many problems which arise when one tries to apply television viewing to scanning sights.

Some of the conflicting requirements will now be listed. Some are simple and obvious, others are more complex and subtle but nevertheless just as demanding if optimum quality is to be achieved.

The observer cannot be too close to the viewing screen or too far away. The screen cannot be tiny if the system is to have any real advantages and the upper limit on the size of the screen is dictated by cost and space limitations. The apparent overall magnification depends on the distance of the observer from the screen as well as on the optical and electrical magnification factors. It cannot be too small (anything much less than unity is unjustified due to resolution loss) and it cannot be too large. For example, in an airplane, the vibration of the plane makes viewing blurred and uncomfortable if the magnification exceeds 6 or 8 say. Also, high magnification decreases the effective brightness of the target.

The field of view of the system should be at least 2.5° and preferably about 15° or more half angle (i.e., from 5° to 30° full field). The scanning prisms are in front of the objective (or first objective if a relay is used) of the system and must be large enough to handle this 30° field of view. These prisms are effectively the pupil of the objective which is, therefore, preferably telecentric (with the aperture stop in the front focal plane) and of sufficient focal length to have this front focal plane at the prisms. The objective must also have a high relative aperture to provide adequate illumination of the ultimate television receiver surface. But long focal length and large relative aperture mean lenses which are large and either costly or inferior in field of view or in image quality. Maximum size is again dictated by space limitations and cost. A relay lens is needed if the objective gives the wrong magnification or has a curved field not matching the receiver surface, or if variable magnification is desired.

The area of the receiver surface is also a factor. In Vidicon type cameras the area is about 0.5 x 0.5 inches; image Orthicon type cameras have the area about 1.2 x 1.2 inches. The total number of scanning lines within or effective at this area and the corresponding number of lines across the viewing screen affect the resolution. There is no point in providing much greater resolution than can be utilized by the observer's eye and this depends on the distance of the observer from the screen. Also there is no point in having an optical system which provides much greater resolution or much less resolution than the electrical system. Electrical magnification is easy compared to optical magnification for a variety of reasons but the relationship of resolution to the number of scanning lines puts a limit on the share of magnification which should be handled by the electrical part of the system.

The eye should not be much closer to the screen than the point at which the lines start to resolve. Thus we have a second criterion on the minimum viewing distance. If the "resolving" point is less than 10 inches, the resolution is better than needed. Thus there is no point in having a large number of lines on a very small screen. This defines the upper limit on the number of lines for any particular size screen.

On the other hand, the eye must be close to the screen to get the proper perspective, the proper angle of view. It is often necessary to tolerate an angle of view slightly less than proper, in order to obtain satisfactory resolution.

Mathematical formulas for the above relationships are given below in connection with Figs. 1 and 2 of the drawings.

Figure 1:
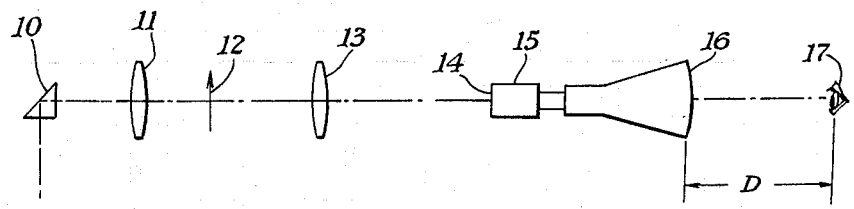
Figs. 1 and 2 are schematic illustrations to aid in the explanation of the relationships involved in the present invention.
Figure 2:
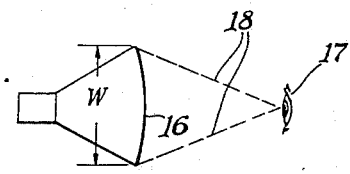

In Fig. 1 a scanning prism 10 reflects light from a target through an objective 11 which forms an aerial image 12 of the target whose size depends on the focal length of the objective 11. This image is relayed by a relay objective 13 onto the sensitive surface 14 of a television camera 15 which is connected to operate a cathode ray tube on whose surface 16 the image is displayed to be viewed by eye 17 of the observer. The apparent angle of view is indicated by broken lines 18 in Fig. 2 which is a horizontal view of the viewing end of the system.

Let $F$=focal length of objective 11;

$R$=magnification by the relay objective 13 which magnification is the ratio of the linear size of the image on surface 14 to the image 12;

$N$=number of scanning lines (total) at the surface 14 and at the surface 16. Of course, in practice some of the lines may inadvertently be off the edge of the surface or the image may not quite fill the surface but these deviations are negligible;

$A$ = width of sensitive area 14;
$W$ = width of screen 16; the height of standard screens is taken as $.81W$;
$M$ = overall magnification of the system;
$D$ = distance of eye 17 from the screen 16.

Using these values, the various other factors and relationships can be defined. First, to define overall magnification, let us refer to an object whose distance in front of the objective 11 is equal to D (i.e., is equal to the screen-to-eye distance). This is arbitrarily selected since at unit magnification, the actual size of such an object would equal the size of the image thereof on the screen 16. This simplifies the computations and is obvious since the object as seen by the objective 11 should look the same size as the image on the screen 16 as seen by the eye at unit overall magnification. Image 12 is $F/D$ times the object size (objective 11 is a fixed distance F from image 12 and lack of focus is neglected in this computation). Image on screen 14 is $$\frac{F \cdot R}{D}$$

times the object size. Image on screen 16 is $$\frac{F}{D} \cdot R \cdot \frac{W}{A}$$

times the object size since the electrical magnification is $$\frac{W}{A}$$

When this value $$\frac{FRW}{DA}$$

is unity, the overall magnification is unity and in all cases this overall magnification M equals $$\frac{FRW}{DA}$$

To avoid annoyance due to shaking of the image in a moving airplane and still have useful magnification, this overall magnification (at the closest viewing distance expected to be used) should be between ½ and 8.

The minimum viewing distance D is 10 inches for comfortable viewing and is some value greater than this if the scanning lines start to resolve, which they do when they subtend at the eye an angle greater than 1.5 to 2 minutes of arc.

The minimum distance is therefore $= \frac{\text{height of screen}}{N \tan 2'}$ $$\text{which} = \frac{.81W}{.00058N} = \frac{1400W}{N}$$

As pointed out before, when this value gets to be less than 10 inches, the resolution is better than necessary.

If one were to use a square rather than a rectangular format so that the height of the image equals the width, the factor of .81 would become unity, the 1400 factor would become 1730 and the same number of lines N would be spread over this increased height, but the effect on the formulas given below would be inconsequential and the various ranges given are still essentially correct. The difference comes in at the selection of just acceptable resolution which is a matter of opinion anyway. Therefore, all of the computations are given only for the preferred form, namely the rectangle.

Thus there is no point in having a 1000 line screen on a tube less than 7.1 inches wide, or 1500 unless 10.7 inches wide, or 2000 unless 14.3 inches wide.

The maximum viewing distance is limited by the space available and by the fact that both angle of view and magnification go down unless a larger screen is used. Whatever value is selected will impose limits of the other factors. For most practical cases an upper limit of 30 inches is reasonable; it is still possible to view such screens from a greater distance but the limitations imposed in terms of a 30-inch maximum are realistic.

The value F is limited to between 2 inches and 4 inches if a reasonable scanning system is to be located (telecentrically) in the front focal plane. A field lens or a field flattener is usually located at the rear focal plane, i.e., at the image 12 but this does not enter into the various calculations given here.

There is a limit to the available relative aperture in lenses of this F covering say 15° half field. The relative aperture effective at the camera 14 is the relative aperture of the objective 11 divided by R and this effective relative aperture must be large enough to provide adequate light on the surface 14. For example, outdoor subjects require about $f/6$ with Vidicon type tubes, so that if R equals 4, the objective 11 would have to be $f/1.5$ or larger which would be expensive to make with satisfactory quality and R equal to 8 constitutes the upper limit of the practical range. The lower limit is not so critical but if R goes much below $\frac{1}{40}$, F has to be so large as to be unreasonable and the electrical magnification has to be high which requires a very wide screen at 16. Furthermore, F times R (which is the equivalent focal length of the whole optical system) must in practice be at least .2 inch in order to utilize all of the width A of the camera even at minimum value of A (discussed below, namely .25 inch) without requiring an impractically wide field for the objective and scanning system. Accordingly, since the maximum F is 4 inches, the minimum R must be .05 rather than $\frac{1}{40}$. A in general is between .25 and 1.25 inches, W is general is between 6 and 36 inches and must be within this range to provide satisfactory viewing angle and resolution at distances D between 10 and 30 inches as discussed above.

If we now apply all of these ranges to the formula $$M = \frac{FRW}{DA}$$

and put in the limit that D exceed $$\frac{1400W}{N}$$

we find that $$M = \frac{FRW}{A} \cdot \frac{N}{1400W} = \frac{FRN}{1400A}$$

and N must exceed $$\frac{1400AM}{FR}$$

where

A is .25 to 1.25 inches
M is 1/2 to 8
F is 2 to 4 inches
R is .05 to 8

This apparently gives a very wide range for N, but there are other limitations thereon. However, before interpreting the effect of any such range there are further limitations on the product of F and R. If R is large the relative aperture of the objective has to be large which is undesirable at long focal lengths because of size and cost. Hence, the upper limit of F.R in practice is about 16. The lower limit of F.R is .2 as discussed above. That is, the minimum R is used only with the maximum F and vice versa. Thus the range F.R is .2 to 16.

The other factor is the one involved in having a proper angle of view. If the field of view has a half angle B equal to 15° (a total angle 2B equal to 30°) or more and $$\tan B \text{ equals } \frac{W}{2D}$$

$\frac{W}{2D}$ must equal .268 or more

D must be less than $\frac{W}{.536}$

This is a difficult requirement to meet and hence D equal to 2W is taken as a tolerable limit and if $$D(\max) = \frac{1400W}{N(\min)}$$

$$N\min = \frac{1400W}{2W} = 700$$

This value is within the wider range defined by $$N = \frac{1400AM}{FR}$$

In practice one can tolerate some resolution of the scanning lines and can thus use a standard television system with N just slightly greater than 500. With this tolerance of resolution the minimum value for N is actually 500 rather than 700.

At a 30° half angle field of view which is about the maximum available with reasonable form of objective and scanning system, $$\frac{W}{2D} = \tan 30° \text{ or less} = .577 \text{ or less}$$

$$D \text{ must be more than } \frac{W}{1.154}$$

If D max=30 inches as suggested above, W max=35 inches (or 36 inches which is the standard size screen nearest the limiting value).

Now to compute the upper limit for N, it is pointed out that there is no point in having more lines than the eye can almost resolve. This ability to resolve is measured at the closest viewing distance in the range selected since the ability to resolve is a maximum at this point. At 10 inches, N should equal 140W and also at 10 inches W should be less than 1.154D, that is less than 11.54 inches.

Therefore, N max is about 1600, or to permit the slight gain in going to resolution slightly better than that barely resolvable or to permit a slight gain if the observer moves to 9 inches instead of 10 inches, N max of 1650 lines is better upper limit in practice.

This upper limit is also well within the range defined by $$N\min = \frac{1400AM}{FR}$$

Thus to provide all of the above discussed relationships, we have the following permissible ranges:

$F = 2$ to 4 inches $A = .25$ to 1.25 inches $M = \frac{1}{2}$ to 8

$R = .05$ to 8

$F.R = .25$ to 16

$N = 500$ to 1650

$W = 6''$ to $36''$ $D = 10$ to 30 inches and at least $\frac{1400W}{N}$

Furthermore, once any of the values are fixed, the range of ideal values for some other factor or factors may be more limited than here specified.

For example, $F = 2.5$ inches, $A = .5$ inch, $$M = \frac{FRW}{DA} = \frac{5RW}{D}$$

Then, if M is to be 1 at D of 15 inches, RW becomes equal to 3, so for a 16 inch screen $R = \frac{3}{16}$ or for a range of screens 6 to 36 inches R has a range of $\frac{1}{2}$ to $\frac{1}{12}$. However, if the overall magnification is to be 2 at this distance D of 15 inches, the range of R is from 1 to $\frac{1}{6}$ and for a magnification of 4 this range goes up to 2 to $\frac{1}{3}$ and R equals 1 on a 12 inch screen.

The limits on aperture can also be worked out. The effective aperture at the surface 14 should exceed $f/8$.

$$\text{This effective aperture} = \frac{FR}{P}$$

where P is the pupil at the scanning prism 10. Thus $$\frac{FR}{P}$$

must be numerically less than 8 for an efficient system.

Figure 3:
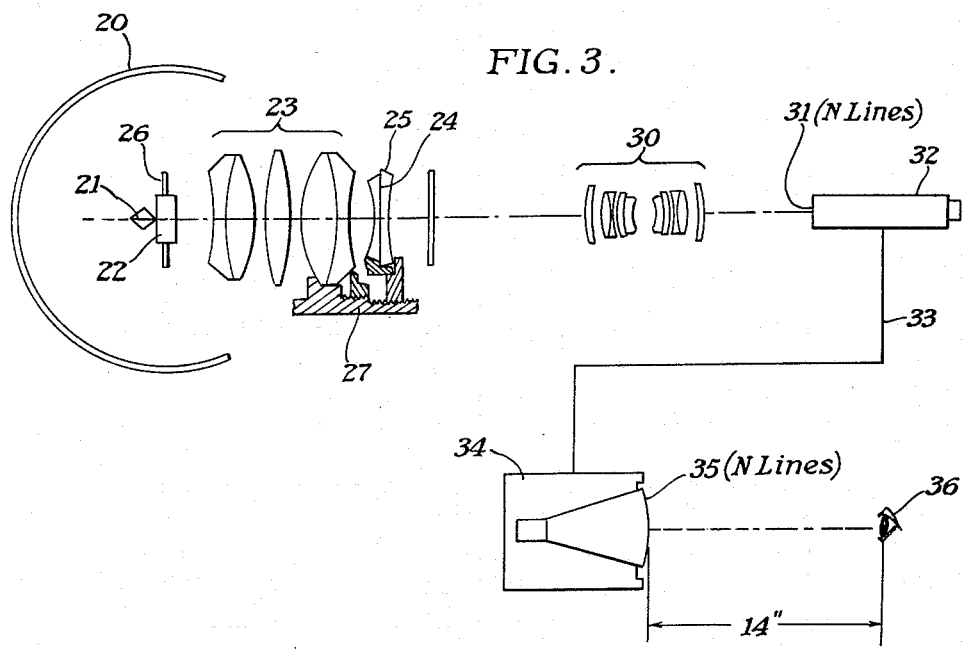
Figs. 3, 4 and 5 are schematic conventional drawings of three preferred embodiments of the invention.

In Fig. 3 a glass or plastic dome 20 acts as a protective window for the instrument. Reflecting surfaces 21 and 22 each consist of the interface formed by a pair of Dove prisms back to back. The size of these prisms depends on the angular field to be covered. The prism 22 is mounted to rotate in one azimuth and about an axis 26 at right angles to the optical system of the sight. Conventional means are used for rotating this prism and hence are not shown since we are here primarily concerned with the optics rather than the mechanical drive mechanisms. The prism 21 is carried with the prism 22 as the latter rotates. A gimbal supporting the prism 21 permits the rotation thereof, again in a conventional manner. The features of the prisms which are of interest in the present discussion are the location and size thereof. They are located in or near the front focal plane of the main objective 23 of the system. They are large enough to receive and reflect through the objective 23 a total angular field of 30°. The objective 23 has a focal length of 2.5 inches. It forms an image of the object viewed, the image being in the plane 24 adjacent to which is a field lens in the form of cemented negative elements 25. An optical filter may be included in the system if desired.

A reticle is usually included in the plane 24 coincident with the image. Thus any horizontal or vertical shift or image distortion in the electrical system will equally affect the reticle as seen on the television display tube. The reticle may be either a frame or crossed lines for aiming. Part of the lens mount 27 for supporting the optical elements and the reticle in the plane 24 is shown.

A relay objective 30 receives light from the image in the plane 24 and refocuses it on the surface 31 of a television camera 32. The relay objective 30 is designed to be correct at finite conjugates and to give an image of the desired size at the surface 31. In general this surface 31 is plane and accordingly the objective 30 is designed to correct for any curvature of the image in the plane 24.

The signal produced by the television camera 32 is transmitted by a suitable wire 33 to a television display system 34 whose image surface is indicated at 35 to be viewed by the eye 36 of an observer at a distance of say 14 inches from the screen 35. The features of this actual system are all within the relationships algebraically defined above in connection with Figs. 1 and 2.

Figure 4:
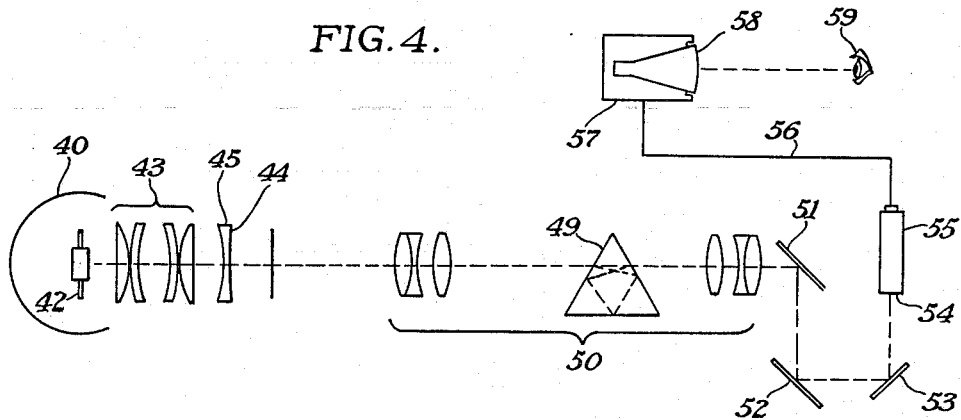

Fig. 4 shows a similar arrangement in which the glass window is indicated at 40, the scanning prism at 42, the objective at 43, and the field flattener at 45 adjacent to the image plane 44. In this case the relay objective 50 consists of two separated parts including therebetween an anti-rotation prism 49. In this case the prism 42 is rotatable about the optic axis of the objective 43 and the prism 49 also rotates to compensate for the rotating of the image. The light is reflected by mirrors 51, 52 and 53 onto the sensitive surface 54 of a television camera 55. As before, the signal is carried by wires 56 to a television receiver 57 whose image surface is indicated at 58 to be viewed by the eye 59 of the observer.

In both Figs. 3 and 4 the television systems have a 1500-line scanning raster. Vidicon cameras are used with receiving surfaces .5 inch in diameter. The viewing screen is 16 inches wide to provide an overall magnification of 2. The magnification of the relay objective 30 or 50 is accordingly about $\frac{1}{3}$.

Figure 5:
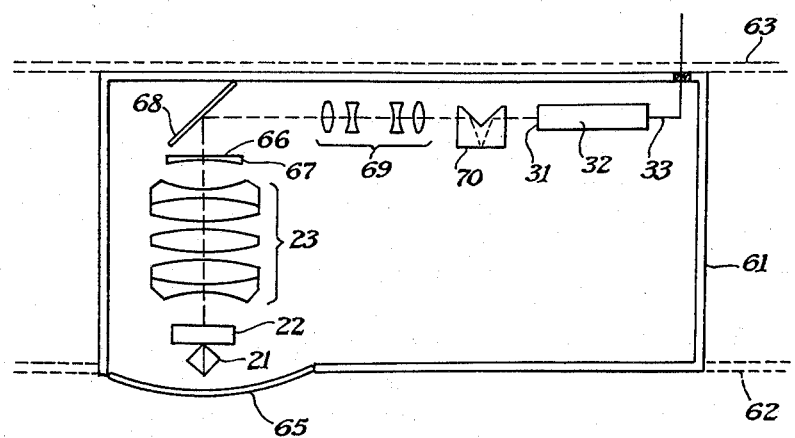

Fig. 5 illustrates a particularly useful form of the present invention for use in high altitude airplanes. The optical system is in general similar to that shown in Figs. 3 and 4, but it is bent so as to fit conveniently in a housing 61 which may be inserted between the outermost skin of the airplane represented by broken lines 62 and the wall of the pressurized cabin represented by broken lines 63. The only part of the unit which extends into the pressurized cabin is the wire 33 leading to the display tube in the cabin. The light from the target is received through a window 65 and scanning prisms 21 and 22, and is focused by an objective 23 on a reticle on the surface 66 of a field lens 67. The light from this image is then reflected by a mirror 68 through a relay lens 69 and an anti-rotation prism 70 onto the camera surface 31. From there on the system is similar to that shown in Fig. 1. The amounts for the individual optical elements are omitted for the sake of clarity, from this Fig. 5, as from the other figures, but it will be noted that there is plenty of room in the housing 61, not only for such mounts, but also for the mechanism to operate the scanning prisms 21 and 33 and the anti-rotation prism 70.

I claim:

1. A sighting device comprising an objective with a focal length between 2″ and 4″, view scanning means optically aligned to receive light from an object to be viewed and to transmit the light to said objective, said objective forming an aerial image of said object, a relay lens for receiving light from said aerial image and for refocusing it at a camera image plane, said relay lens having a magnification between .05 and 8, said focal length multiplied by said relay magnification being between .2 and 16, the $f$ aperture of said objective multiplied by said relay magnification being greater, i.e., larger aperture, than $f/8$, a television camera with 500 to 1650 lines, positioned with its sensitive surface in said camera image plane, a television image tube connected to receive the signal from said television camera and to display a picture corresponding to the image on the sensitive surface.

2. A sighting device according to claim 1 having a reticle on a transparent member and means for supporting the reticle in the plane of said aerial image.

3. A sighting device comprising a television camera with a flat photosensitive surface, an optical system for receiving light from an object and for forming an image on said surface and a cathode ray tube connected to receive a signal from said camera and for displaying a picture of said image to be viewed at a distance D between 10 and 30 inches from said tube, D being greater than $$\frac{1400W}{N}$$

where W is the width of said tube and N the number of television scanning lines in the camera surface and in the tube surface, N being between 500 and 1650, W being between 6″ and 36″, said camera surface having a width between .25 and 1.25 inches, said optical system comprising a rotatable reflecting surface for receiving light from the object and reflecting it, an objective aligned to receive the reflected light and to form a first aerial image of the object and a relay lens for focusing the light from the first aerial image onto the camera surface, said objective having a focal length F between 2″ and 4″ and a pupil of diameter P approximately at the reflecting surface giving an effective aperture $F/P$, the relay lens having a magnification R between .05 and 8, the overall effective aperture $$\frac{RF}{P}$$

being numerically less than 8, the overall effective focal length RF being between 2 and 16.

4. A sighting device for aircraft comprising an optical system for forming in an image plane, an image of the object to be viewed, a television camera with its photosensitive surface in said plane and a picture display member for receiving the signal from said camera and for displaying an enlarged picture of said image, said optical system consisting essentially of rotatable reflecting means for receiving light from the object and for reflecting it into the rest of the system, an objective with a focal length F between 2″ and 4″, a field between 5° and 60°, and an effective aperture P approximately at said reflecting means greater than $f/8$, for forming a first image of the object and a relay lens with a magnification R between ¼ and 4, P being greater than $$\frac{RF}{8}$$

said relay lens receiving light from said first image and forming the image on the television camera surface.

5. A sighting device according to claim 4 in which the television camera and display member have rasters with N lines where N is between 500 and 1650, the sensitive surface has a width A between .25 and 1.25 inches and $$\frac{RFN}{1400A}$$

is between ½ and 8.

6. A sighting device for aircraft comprising an optical system for forming in an image plane, an image of the object to be viewed, a television camera with its photosensitive surface in said plane and a picture display member for receiving the signal from said camera and for displaying an enlarged picture of said image, said optical system consisting essentially of rotatable reflecting means for receiving light from the object and for reflecting it into the rest of the system, an objective with a focal length F between 2″ and 4″ for forming a first image of the object, and a relay lens for receiving light from the first image and, with a magnification R, for forming the image on the television camera surface, the television camera and display member having rasters with N lines where N is between 500 and 1650 and the sensitive surface has a width A between .25 and 1.25 inches where $$\frac{RFN}{1400A}$$

is between ½ and 8.

References Cited in the file of this patent

UNITED STATES PATENTS

| | | |
|---|---|---|
| 1,360,735 | Du Mazuel | Nov. 30, 1929 |
| 1,957,128 | Ball et al. | May 1, 1934 |
| 2,359,032 | Gott | Sept. 26, 1944 |
| 2,698,356 | Roos | Dec. 28, 1954 |